(12) United States Patent
Kihara

(10) Patent No.: US 8,126,193 B2
(45) Date of Patent: Feb. 28, 2012

(54) IMAGE FORMING APPARATUS AND METHOD OF IMAGE FORMING

(75) Inventor: Yuka Kihara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1024 days.

(21) Appl. No.: 12/045,495

(22) Filed: Mar. 10, 2008

(65) Prior Publication Data

US 2008/0304700 A1    Dec. 11, 2008

(30) Foreign Application Priority Data

Mar. 16, 2007  (JP) .................... 2007-069596

(51) Int. Cl.
*G06K 9/00*    (2006.01)
(52) U.S. Cl. ....................................... 382/100
(58) Field of Classification Search .............. 382/100
See application file for complete search history.

(56) References Cited

U.S. PATENT DOCUMENTS

| | | | | |
|---|---|---|---|---|
| 7,386,149 B2 * | 6/2008 | Eguchi et al. | ................. | 382/100 |
| 2007/0019244 A1 * | 1/2007 | Rekiere | ................ | 358/3.28 |

FOREIGN PATENT DOCUMENTS

| | | |
|---|---|---|
| JP | 6-253135 | 9/1994 |
| JP | 8-51540 | 2/1996 |
| JP | 9-186603 | 7/1997 |
| JP | H11-075052 | * 3/1999 |
| JP | 2001-218037 | 8/2001 |
| JP | 2002-190947 | 7/2002 |
| JP | 2004-104494 | 4/2004 |
| JP | 2004-260273 | 9/2004 |
| JP | 2005-229508 | 8/2005 |
| JP | 2006-079348 | * 3/2006 |
| JP | 2006-014191 | * 6/2006 |

OTHER PUBLICATIONS

Japanese Office Action issued Jun. 7, 2011, in Patent Application No. 2007-069596.

* cited by examiner

*Primary Examiner* — Tom Y Lu
(74) *Attorney, Agent, or Firm* — Oblon, Spivak, McClelland, Maier & Neustadt, L.L.P.

(57) ABSTRACT

An apparatus for and a method of image forming which embeds digital watermark information into an image data of a document and outputs the image data that includes determining the page of the document in which the digital watermark information is to be embedded based on a predetermined condition, the predetermined condition corresponding to whether the document is composed of two or more pages, embedding the digital watermark information into the page of the document determined by the above described determination and outputting the image data which is embedded in the digital watermark information by the above described embedding.

10 Claims, 12 Drawing Sheets

IMAGE FORMING APPARATUS AND METHOD OF IMAGE FORMING

CROSS REFERENCE TO RELATED APPLICATION

This application is based upon and claims the benefit of priority from the prior Japanese Patent Application No. 2007-069596, filed on Mar. 16, 2007, the entire content of which is incorporated herein by reference.

BACKGROUND OF THE INVENTION

1. Field of the Invention

The present invention relates to an image forming apparatus and the method of the image forming, which embeds a digital watermark under an appropriate page in the document data.

2. Description of the Background Art

Digital watermarking is a technology that embeds different information in an image. Concretely, the object is to add information without degrading the quality of the image. It is very important to consider the balance of the image quality, volume of information, and the tolerance to unauthorized access when embedding watermark information. In digital watermarking, the image quality of the image data embedded as watermark information, the tolerance to unauthorized access and the volume of information that can be embedded are subject to trade-offs. That is, as the tolerance to unauthorized access weakens, the image quality deterioration caused by the embedded processing is also suppressed. In addition, as the amount of image quality degradation decreases the volume of information that can be embedded also decreases. On the other hand, as the image quality deterioration caused by the embedded processing grows, the volume of information that can be embedded in the image is increased. Many of the methods of digital watermarking attempt to improve accuracy based on a consideration of the above-mentioned balance. For example, in Japanese Patent Laid-open No. 2004-104494, there is proposed a digital watermarking embedding apparatus, which considers the relation between volume of information and embedding strength in the watermark that the user can embed. This reference discloses that the amount of deterioration of the image quality is established before the embedding. Japanese Patent Laid-open No. 2002-190947 discloses a system that determines a suitable watermark based on the protection level of the document, the protection level based on the potential for counterfeit of the printed document. Furthermore, Japanese Patent Laid-open No. 2004-260273 discloses a technique for lowering the tolerance of unauthorized access when two or more pages are reduced in order to be printed on a single page. However, the influence that the output device gives to the tolerance to unauthorized access and the image quality of the digital watermark cannot be disregarded, and a concrete technique for embedding a digital watermark in consideration of the above-mentioned circumstances is desired. Furthermore, the processing time needed to extract information becomes a problem when digital watermark information must be extracted from a paper medium. A number of innovations have been proposed to address the issue of extracting digital watermark information efficiently. For example, Japanese Patent Laid-open No. 2001-218037 discloses that the extraction of watermark information is not executed when the extraction of watermark information is not necessary. However, a concrete method of efficiently extracting embedded information when the document including the digital watermark embedded therein is composed of two or more pages has not been achieved.

SUMMARY OF THE INVENTION

The present invention is designed to solve, at least, these problems by providing an image forming apparatus that embeds the digital watermarking information into an image data of a document and outputs the image data, the image forming apparatus including a determination unit that determines the page of the document to embed the digital watermarking information based on a predetermined condition such as if the document is composed of two or more pages. Further a digital watermarking embedding unit embeds the digital watermarking information to the page of the document determined by the determination unit and an image outputting unit outputs the image data which is embedded as the digital watermarking information by the digital watermarking embedding unit.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

The embodiments of the present invention will be explained in detail below by referring to the figures.

First, the problems that the present invention is to solve will be explained.

Figure 1:
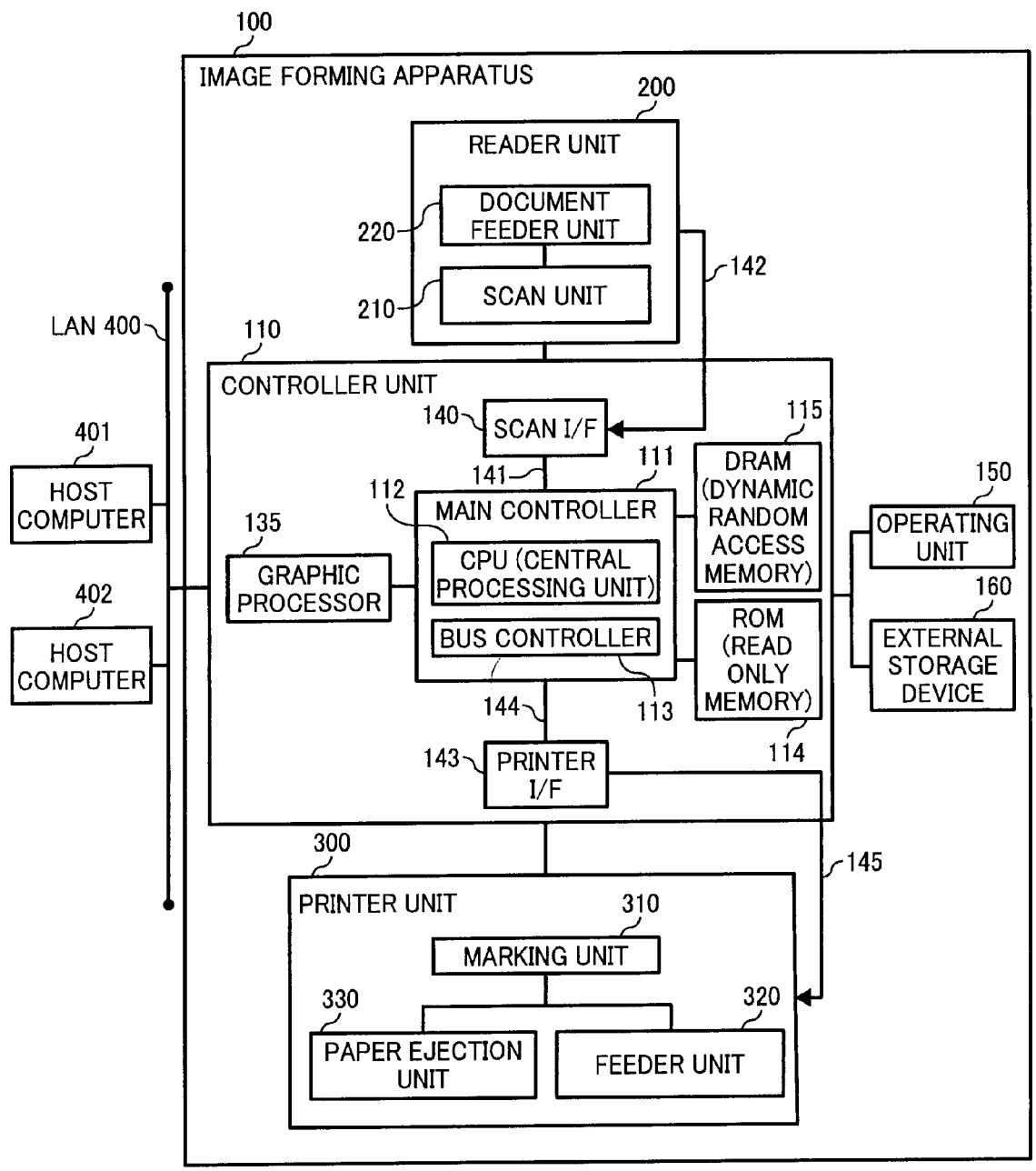
FIG. 1 is a block diagram showing an example of the system configuration for a basic image forming apparatus.

FIG. 1 shows an example of the system configuration for the basic image forming apparatus.

The image forming apparatus includes a reader unit 200, a controller unit 110, a printer unit 300, an operating unit 150 and an external storage device 160.

The reader unit 200 scans images in documents optically and converts the scanned images into image data. The reader unit 200 includes a scan unit 210 and a document feeder unit 220. The scan unit 210 has the function of scanning the document. The document feeder unit 220 has the function of feeding copy paper.

A printer unit 300 feeds recording paper, forms the image data as visible images on the recording paper and feeds the formed paper out of the image forming apparatus 100. The printer unit 300 includes a marking unit 310, a feeder unit 320 and a paper ejection unit 330.

The marking unit 310 has the function of fixing the image data on the recording paper. The feeder unit 320 includes a cassette for storing recording paper and is comprised of two or more kinds of cassettes. The paper ejection unit 330 has the function of sorting the recording paper and outputting the sorted recording paper out of the image forming apparatus 100.

The controller unit 110 is electrically coupled to the reader unit 200 and the printer unit 300. Furthermore, the controller unit 110 is coupled to host computers 401 and 402 via a LAN (Local Area Network) 400. The controller unit 110 provides a copy function, scan function and printer function by controlling the reader unit 200. The main controller 111 controls the controller unit 110. The main controller includes a CPU (Central Processing Unit) 112 and a bus controller 113. The CPU 112 is operated based on a program which is stored in a ROM (Read Only Memory) 114. In addition, the CPU 112 interprets PDL (Page Description Language) data received from the host computers 401 or 402 and converts the PDL data into a raster image. The bus controller 113 controls DMA (Direct Memory Access) and enforces arbitration during bus competition.

A DRAM (Dynamic Random Access Memory) 115 is coupled to the main controller 111 via a DRAM I/F. The DRAM 115 stores the image data and is used when the CPU 112 operates. A graphic processor 135 performs the functions of rotating and magnification. In addition, the digital watermark processing is performed by the graphic processor 135.

Connectors 142 and 145 are coupled to the reader unit 200 and the printer unit 300. The scan I/F 140 is coupled to the reader unit 200 through the connector 142 and to the main controller through the scan bus 141. The scan I/F 140 has the function of processing the image data received from the reader unit 200. Furthermore, the printer I/F 143 outputs a control signal via the printer bus 144. The control signal is generated based on the video signal transferred from the printer unit 300.

The operating unit 150 includes a liquid crystal display unit and an input unit. For example, in a non-limiting example the input unit may be a touch panel in the liquid crystal display unit. Furthermore, the operating unit 150 is coupled to the controller unit 110 and signals generated by the input unit are transferred to the CPU 112.

Figure 2:
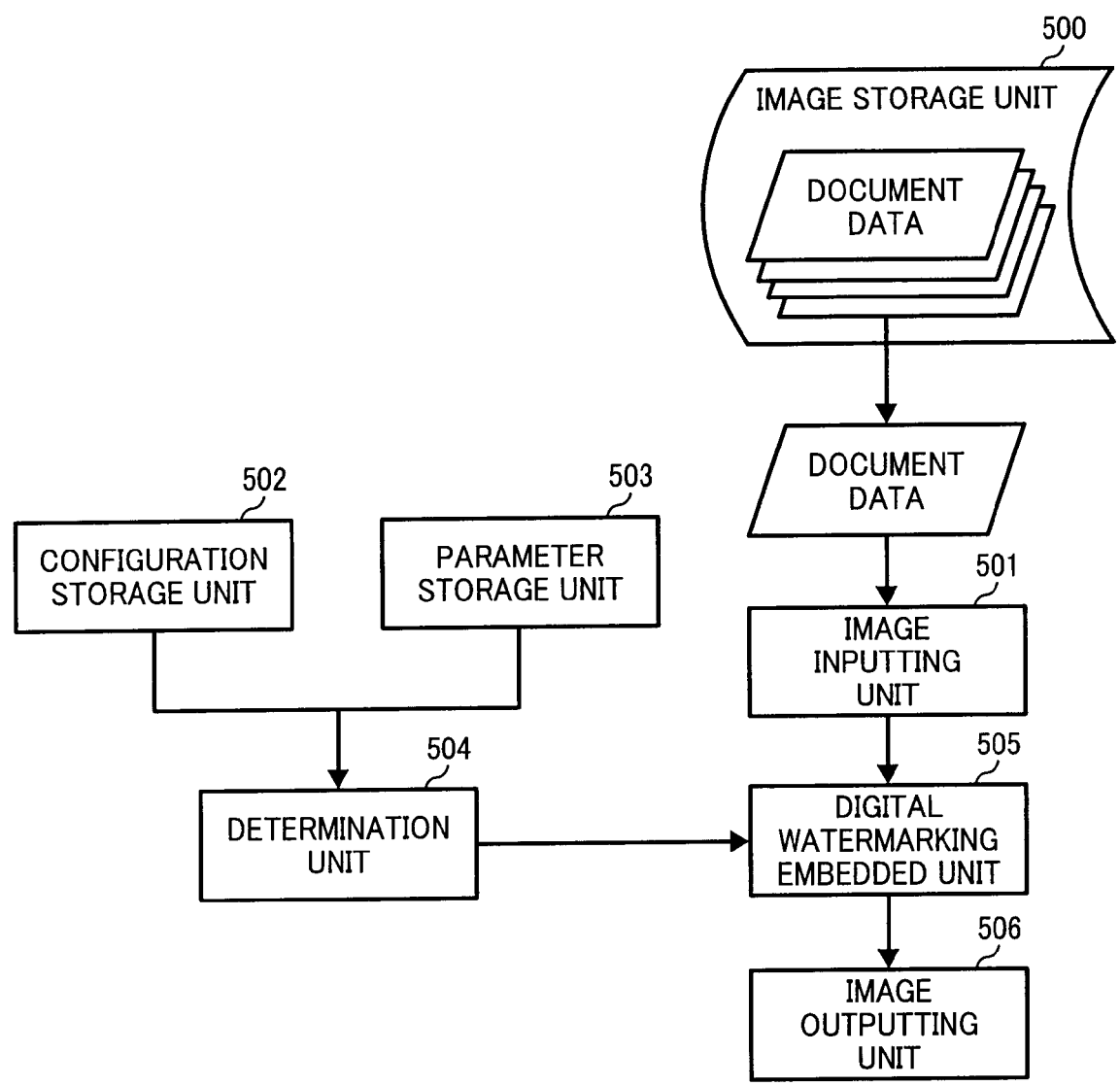
FIG. 2 is a block diagram showing the outline of the embedded digital watermark in this invention.

FIG. 2 is a block diagram showing the process of embedding the digital watermark. The image forming apparatus in this invention includes an image storage unit 500, an image inputting unit 501, a configuration storage unit 502, a parameter storage unit 503, a determination unit 504 and a digital watermark embedding unit 505.

The image storage unit 500 stores the image data (document data) converted from the PDL data and received from the host computers 401 or 402. Furthermore, the document data corresponds to a page of a document that is input into the image storage unit 500 by the image inputting unit 501.

The configuration storage unit 502 stores the output condition determined from the PDL data such as one sided copying. The parameter storage unit 503 stores the condition that the page processed by the embedded processing is to be determined from the image data. For example, this condition enables determination of the specific page in which the digital watermark is to be embedded.

The determination unit 504 then determines where the embedded digital watermark should be placed based on the data from the configuration storage unit 502 and the parameter storage unit 503. For example, if the output condition is "both sides" and the embedded condition is "the digital watermark information is embedded on only one side" it is determined that the digital watermark data should be embedded in the odd pages of the document.

The digital watermarking embedded unit 505 then embeds the digital watermark in the determined page of the documents based on the determination of the determination unit 504. The image outputting unit 506 then outputs the image including the embedded digital watermark.

Figure 3:
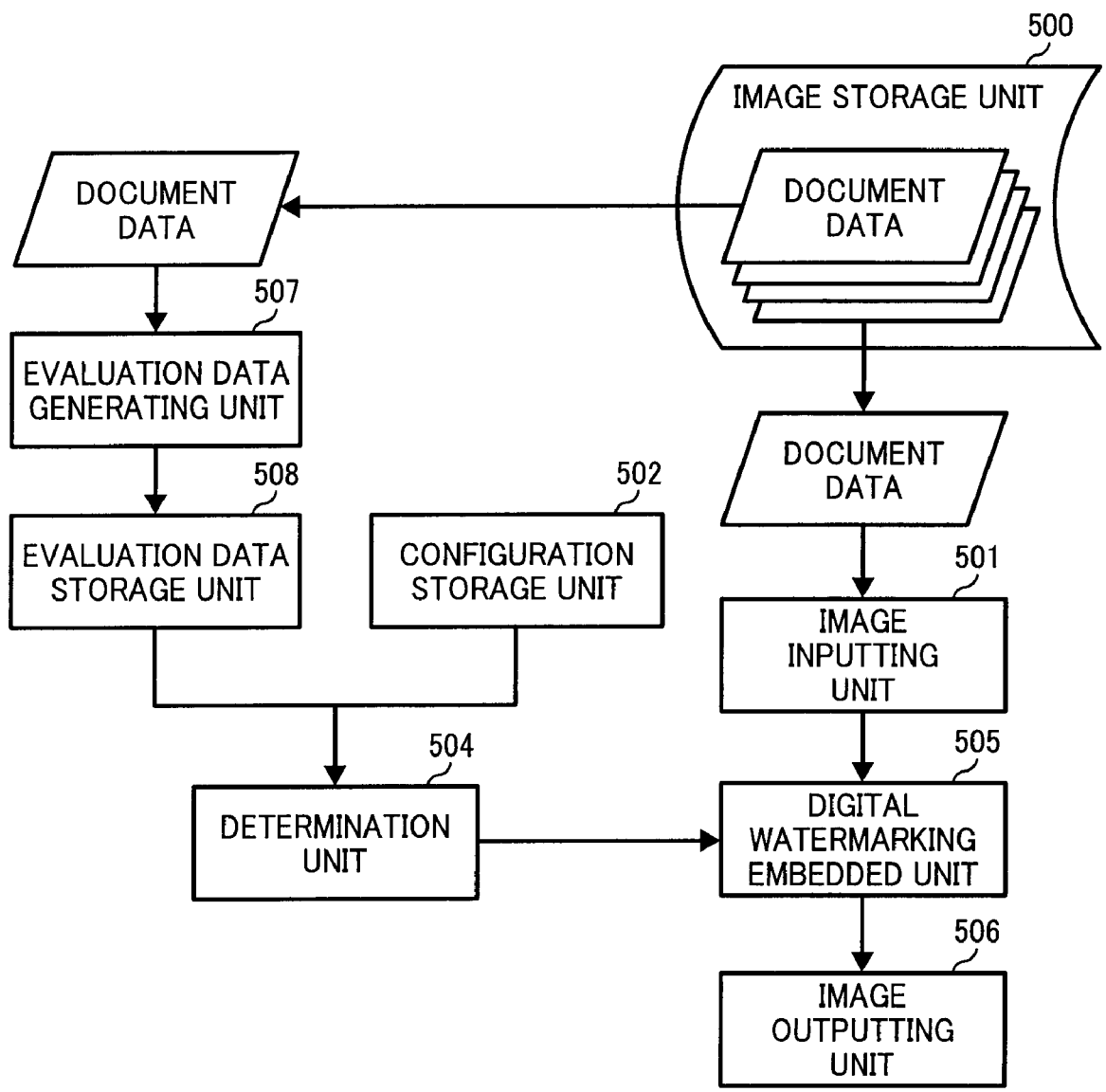
FIG. 3 is a block diagram showing an example of the system configuration for the embedded digital watermark in the first embodiment.

Next, FIG. 3 is a block diagram showing another example of the image forming apparatus in the first embodiment. The image forming apparatus shown in FIG. 3 is similar to the composition shown in FIG. 2 but differs in the introduction of an evaluation data storage unit 508 in place of the parameter storage unit 503. In addition, the image forming apparatus illustrated in FIG. 3 also includes an evaluation data generating unit 507.

The evaluation data generating unit 507 generates the evaluation data from the image data which is read from the image storage unit 500. The evaluation data is then stored in the evaluation data storage unit 508. The evaluation corresponds to a numerical value that indicates how suitable a page is for an embedding process. For example, Japanese Patent Laid-open No. 1998-186603 illustrates a digital watermarking method using binary image data. Japanese Patent Laid-open No. 1999-186603 discloses that the digital watermarking information is embedded in the document by the changing of the length of the blank between words of sentences. The watermark is embedded based on the amount of characters in the document image according to this technique. As a result, the level of difficulty to embed is inversely proportional to the number of characters.

Figure 4:
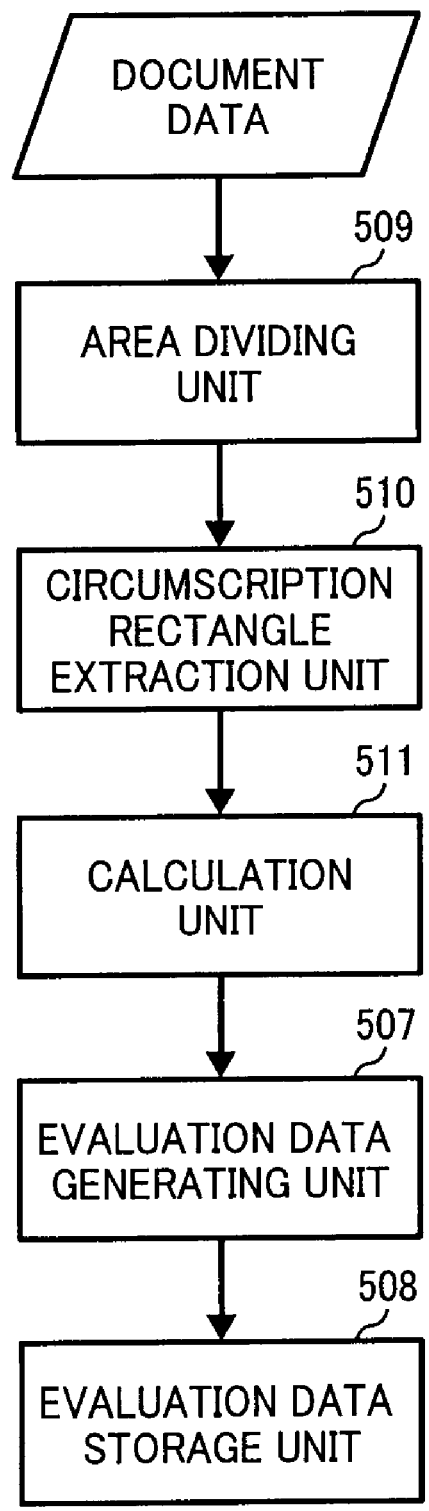
FIG. 4 is a block diagram showing an example of the system configuration for evaluation data generating unit in the first embodiment.

In the present application, the embedded evaluation data is generated according to the procedure shown in FIG. 4. Specifically, when the image data which corresponds to one page of the recording paper is input, the area dividing unit 509 divides the input image data into a plurality of areas. For example, the plurality of areas may be a text area, a figure area, a graph area and a table area, etc. The text rectangle extraction unit 510 determines a text rectangle that corresponds to the area which has a text attribute. The text rectangle is a rectangle which surrounds the character in question. The method of extraction is that the document image is projected onto the vertical coordinate axis, and the blank part is searched. As a result, each line is divided.

The document image is then projected to the horizontal coordinate axis by each line, and the blank part is searched. As a result, each character in the text rectangle can be cut out. The calculation unit 511 then counts the number of text rectangles that are cut out by the text rectangle extraction unit 510. As a result, the number of characters in the document is determined by the calculation unit 511. The evaluation data generating unit 507 then determines a level corresponding to the suitability of the page based on the number of characters found therein. After determining this level, the data is stored in the evaluation data storage unit 508.

Figure 5:
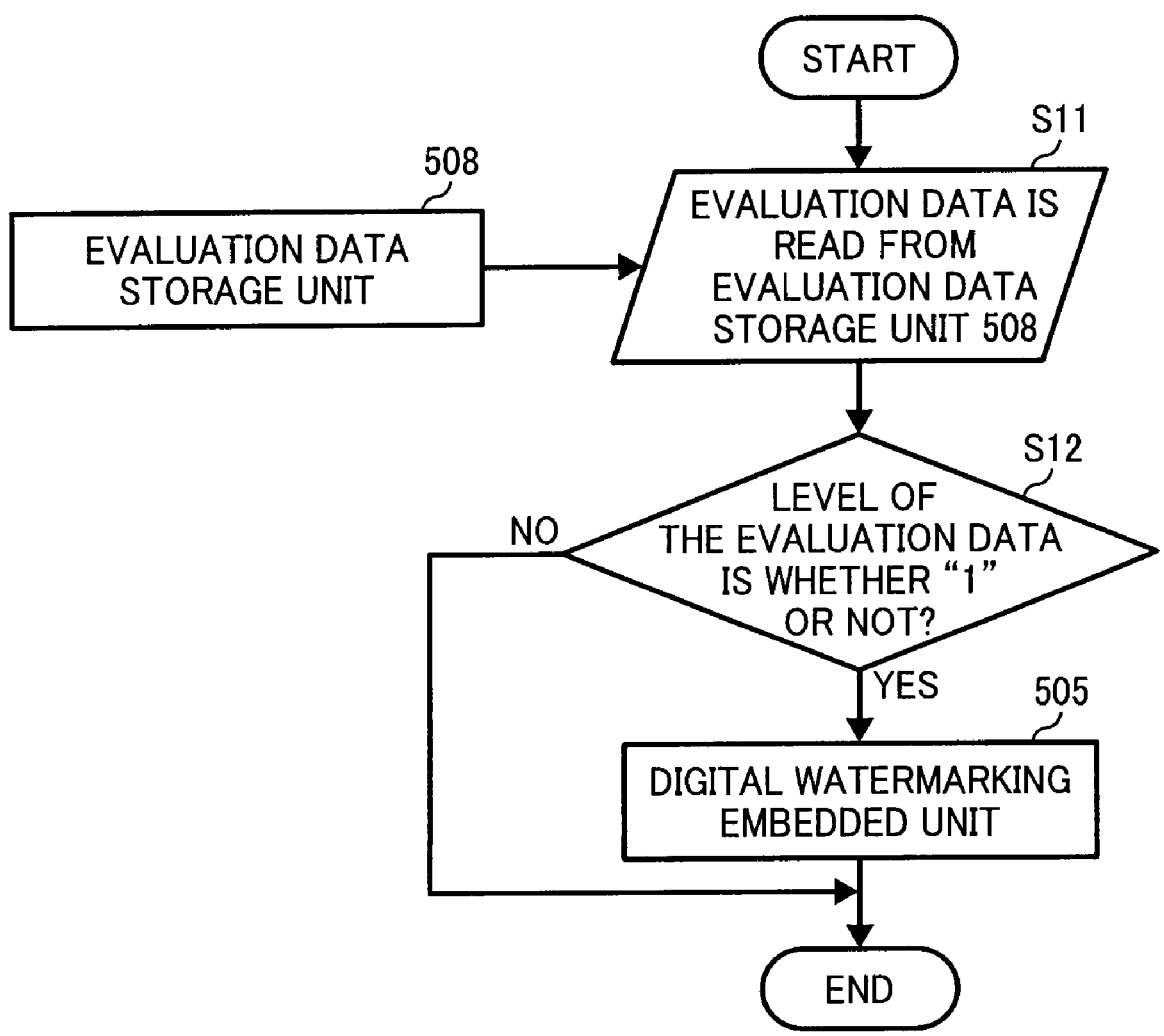
FIG. 5 is a block diagram showing an example of the system configuration for determination unit in the first embodiment.

FIG. 5 is a block diagram showing a determination unit 504. Step S11 shows that the evaluation data is read from the evaluation data storage unit 508. If the evaluation data is determined to be "1", the watermark information is embedded under the corresponding page by the digital watermarking embedded unit 505.

Accordingly, the digital watermarking system of the present invention is able to determine the page in which the watermark information will be most easily embedded. As a result, image quality deterioration is minimized and the embedding processing is simplified.

Figure 6:
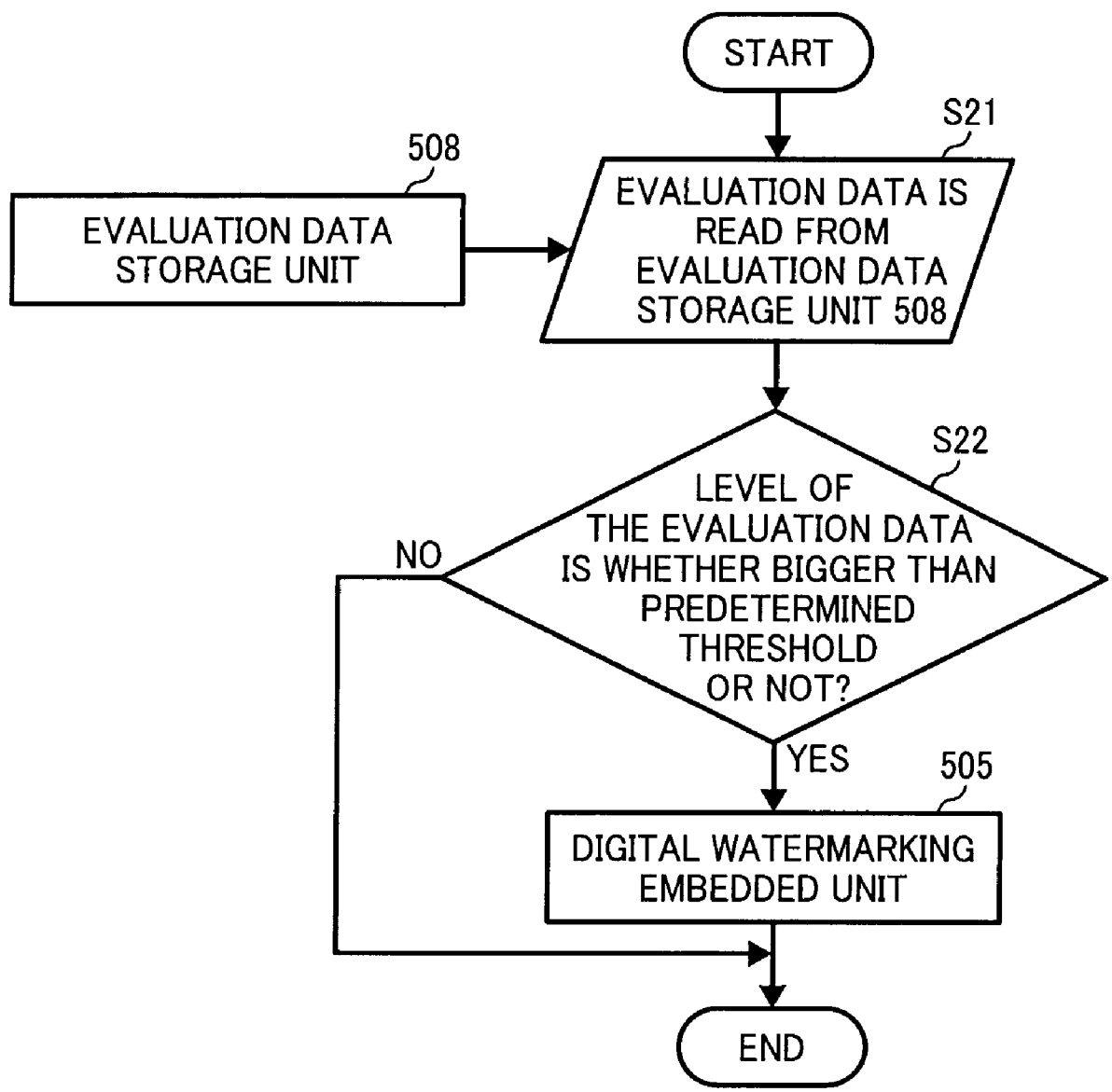
FIG. 6 is a block diagram showing an example of the system configuration for determination unit in the second embodiment.

The above-embodiment is described assuming that the evaluation data is equal to "1". However, it is also possible to set a threshold for the evaluation data as is shown in the second embodiment. In this case, if the evaluation data is smaller than a predetermined threshold, then the digital watermark information is embedded in all of the pertinent pages as is shown in the example found in FIG. 6.

Figure 7:
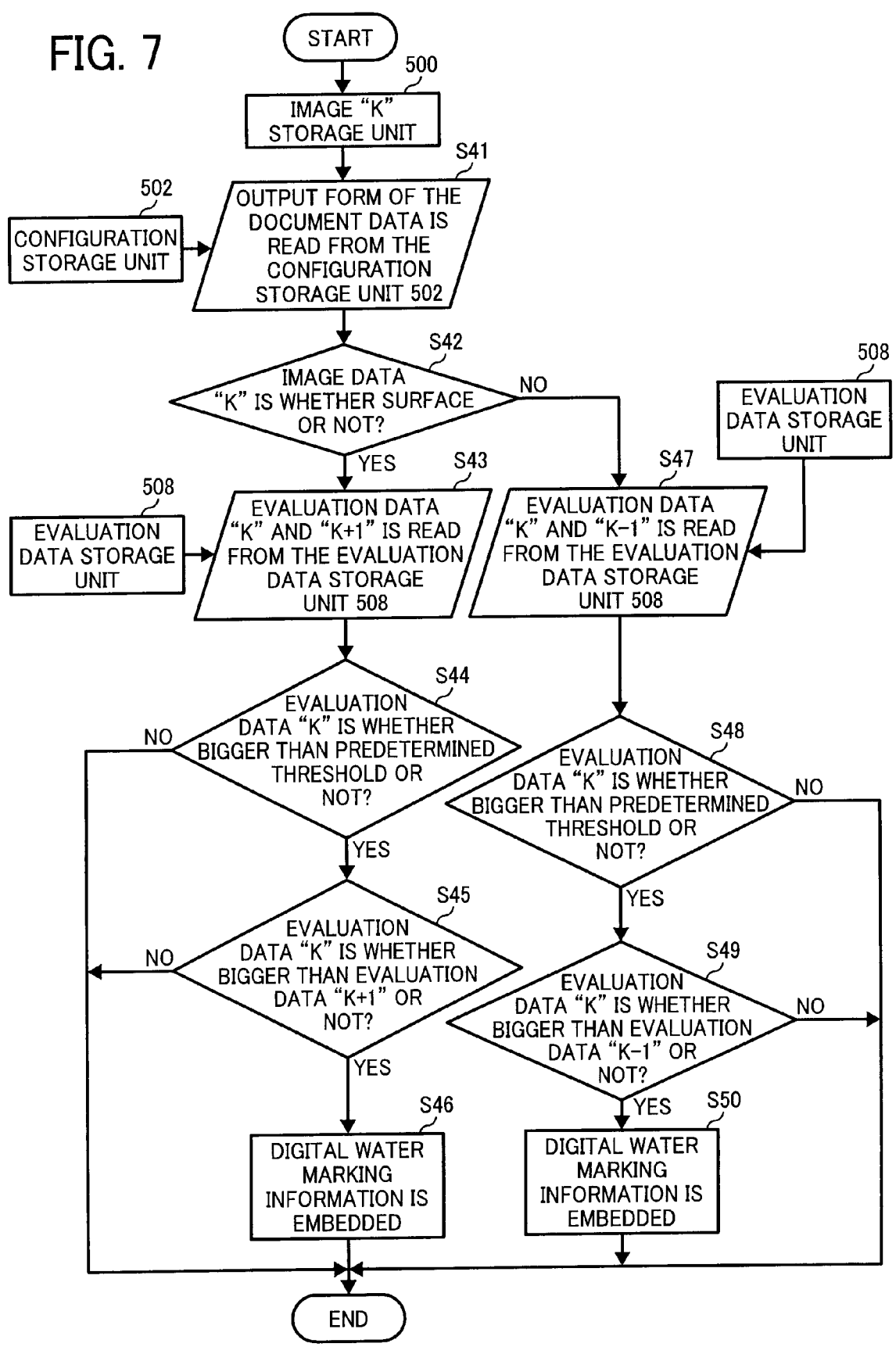
FIG. 7 is a block diagram showing an example of the system configuration for determination unit in the third embodiment.

The third embodiment is shown using a block diagram of the determination unit 504 in FIG. 7. In this embodiment, it is determined if the output form of the document data is double-side printing. If so, it is then determined if the evaluation data is bigger than the predetermined threshold. Further, each evaluation data is then compared and the watermark information is embedded in the page in which it can be most easily embedded, as is shown in FIG. 7.

In this embodiment the image data is input from the image inputting unit 501. The image data corresponds to a k page of the document which is assumed to be image data "k". Step 41 shows that the output form of the image data is read from the configuration storage unit 502. Step 42 shows that the image data k is evaluated in order to determine whether the data is designated for double-side printing or not. Step 43-50 shows that the page in which the watermark information is to be embedded is determined based on a consideration of both sides of the data. Therefore, if the both sides are determined as being suitable for embedding, the watermark information is embedded on the side where the embedding ease level is the highest. As a result, it is possible to embed the digital watermarking information under the most appropriate page.

Figure 8:
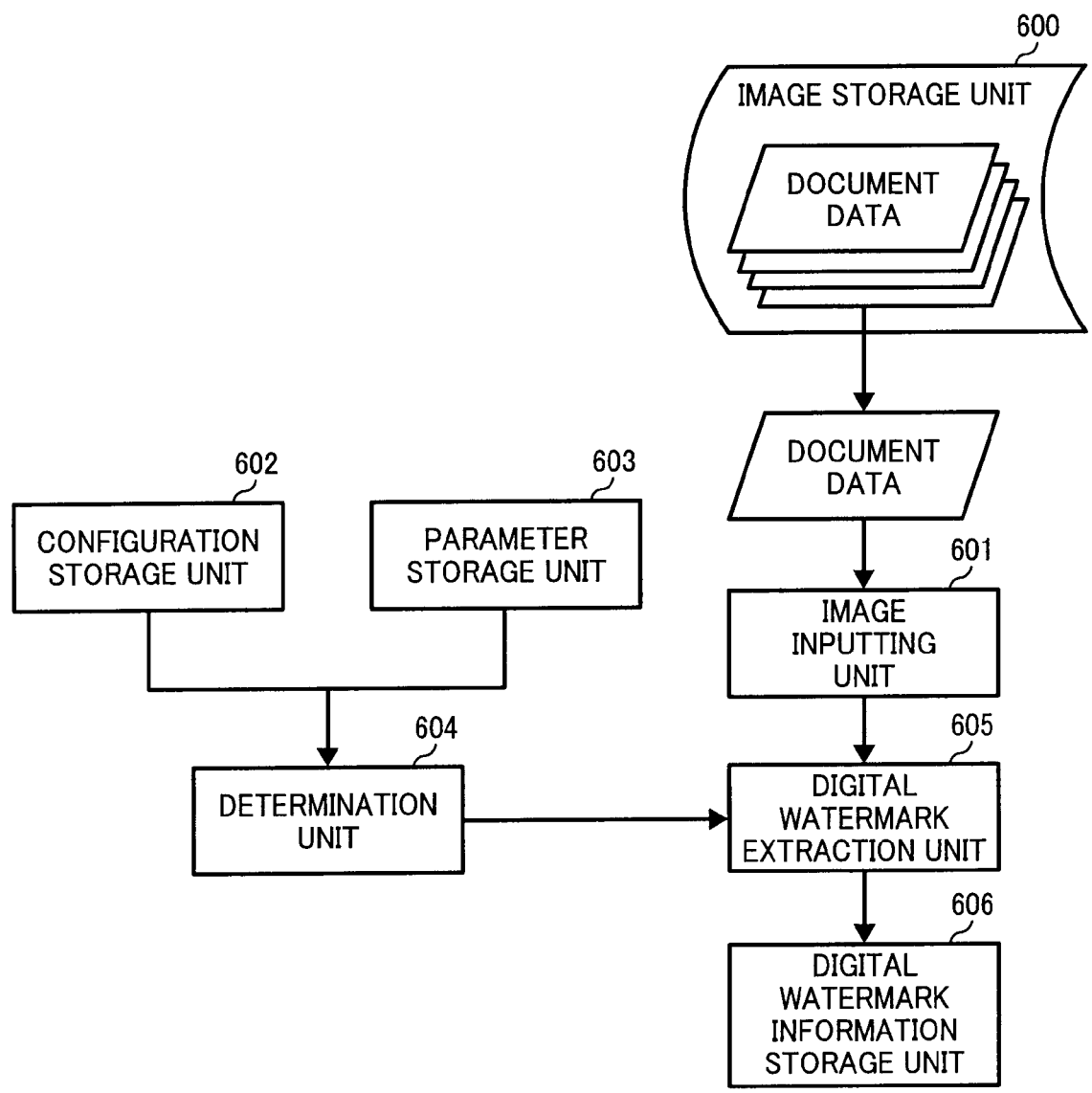
FIG. 8 is a block diagram showing the outline of the digital watermark extraction system in this invention.

FIG. 8 is a block diagram showing the outline of the digital watermark extraction system. The image forming apparatus in the present application includes, at least, an image storage unit 600, an image inputting unit 601, a configuration storage unit 602, a parameter storage unit 603, a determination unit 604, a digital watermark extraction unit 605 and a digital watermark information storage unit 606.

The image storage unit 600 stores the document data which is read by the reader unit 200. The document data corresponds to a page of the target document that is stored in the image storage unit 600 and received from the image inputting unit 601.

The configuration storage unit 602 stores selection information which is input from the operating unit 150. The parameter storage unit 603 stores the condition used to determine the page on which the extraction processing is performed. For example, the condition designates the page from which the digital watermark is extracted.

The determination unit 604 determines the page in which the digital watermark is embedded. For example, if the document output condition is "both sides" and the embed condition is the digital watermark information embedded on only one side of the recording paper, it is determined that the digital watermark is embedded under the odd page of the document. The digital watermark extraction unit 605 then extracts the digital watermark information from the predetermined page of the document image based on the determination of the determination unit 604. The digital watermark information is then extracted by the digital watermark extraction unit 605 and stored in the digital watermark information storage unit 606.

Thus, in the third embodiment, the determination processing on the embedded page is explained based on the assumption that the output form of the document image data corresponds to double-side printing.

Figure 9:
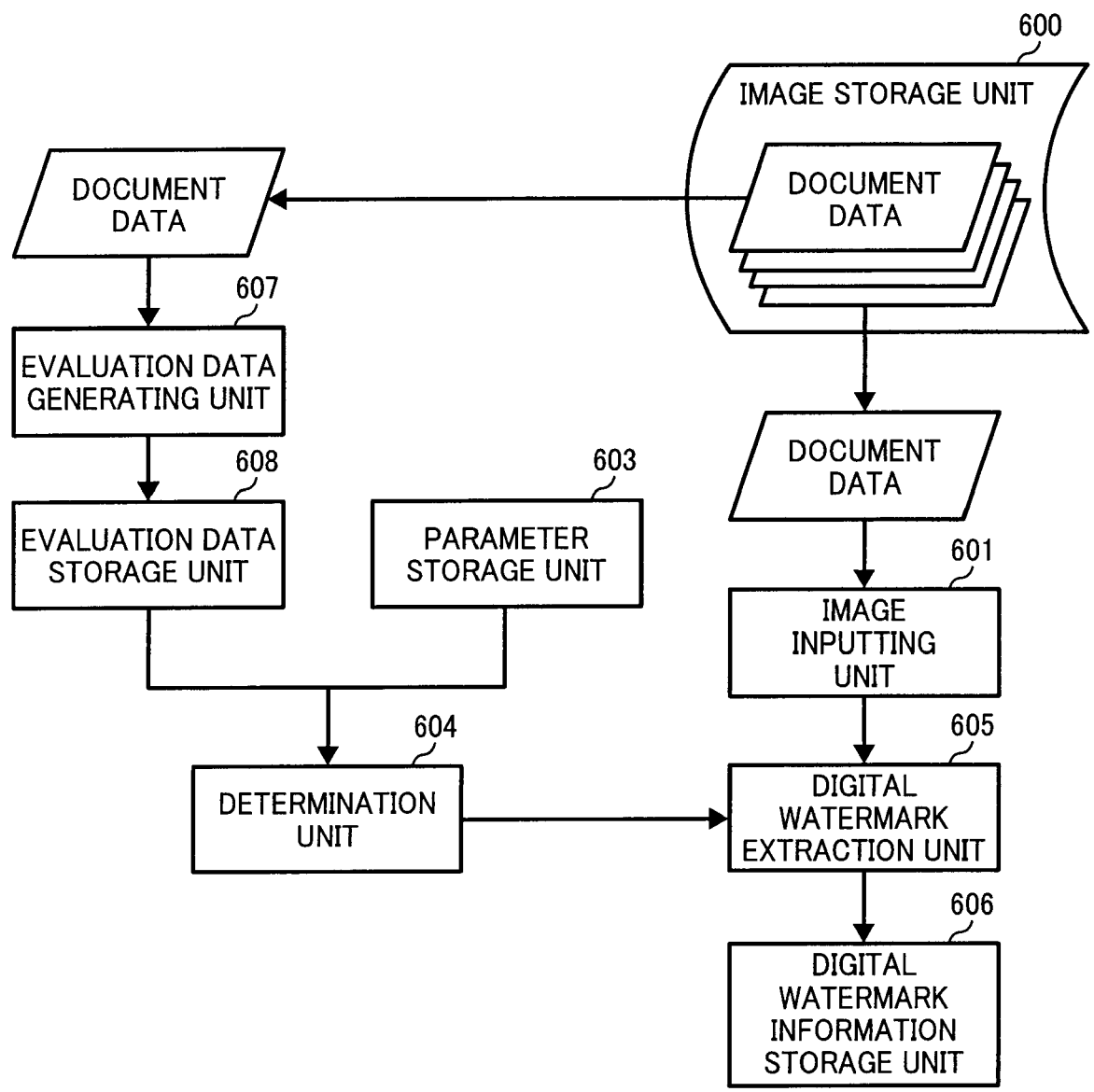
FIG. 9 is a block diagram showing an example of the system configuration for the digital watermark extraction system in the fourth embodiment.
Figure 10:
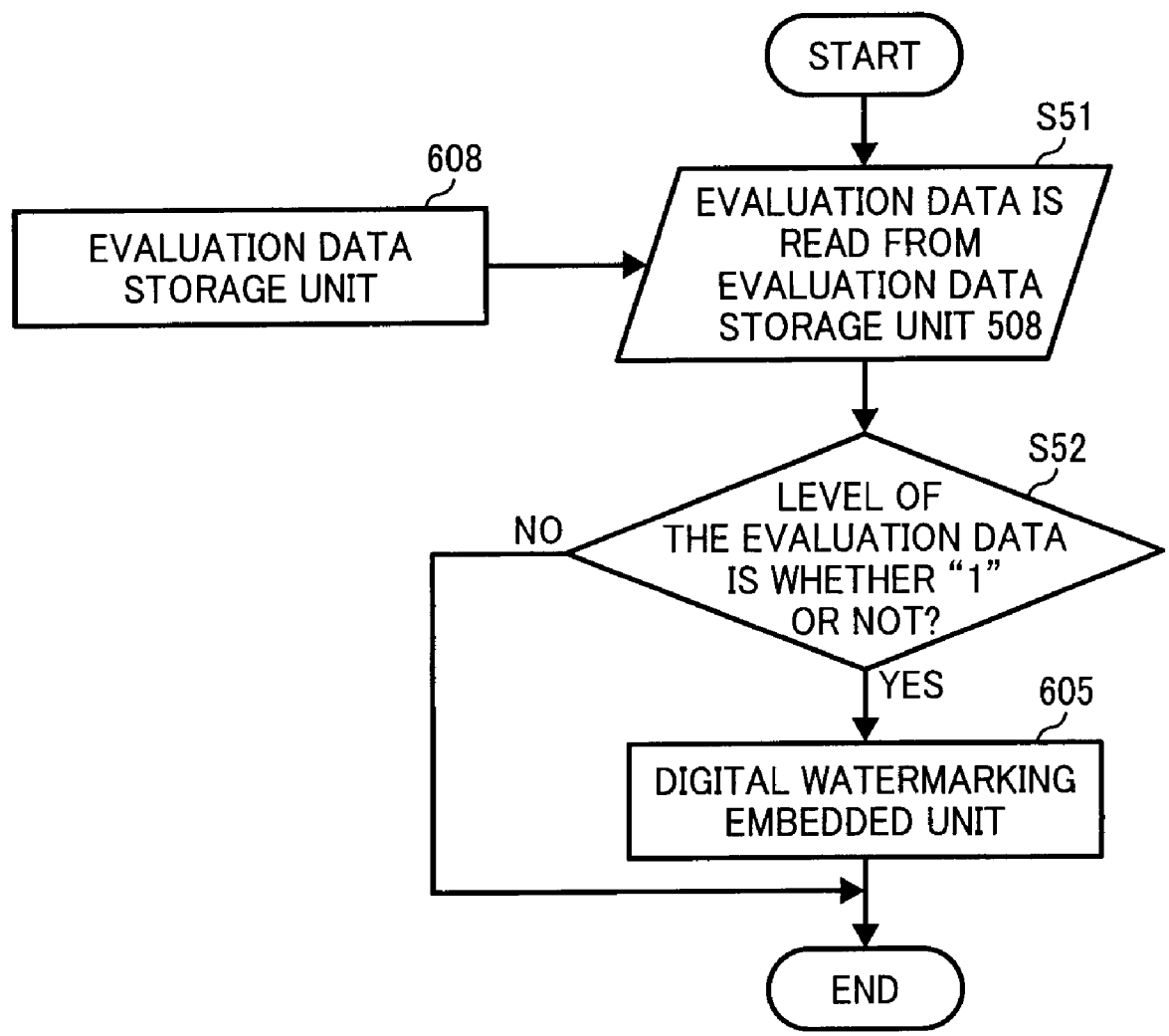
FIG. 10 is a block diagram showing an example of the system configuration for determination unit in the fourth embodiment.

FIG. 9 is a block diagram showing an example of the system configuration for the digital watermark extraction system of the fourth embodiment. The digital watermark extraction system in FIG. 9 has an evaluation data generating unit 607 and an evaluation data storage unit 608 in addition to the composition illustrated in FIG. 8. The extraction evaluation data is a numerical value that shows the extraction ease level. For example, the determination of the page from which the digital watermark information is to be extracted may be based on the number of characters in the document image data as is shown in FIG. 10.

Step 31 shows that the evaluation data is read from the evaluation data storage unit 608. Step 32 shows that if the evaluation data is determined to be "1", the watermark information is extracted under the corresponding page by the digital watermarking extraction unit 605.

Thus, in the digital watermarking system described herein, by determining the page where watermark information is most easily extracted, it is possible to speed up digital watermark processing.

Figure 11:
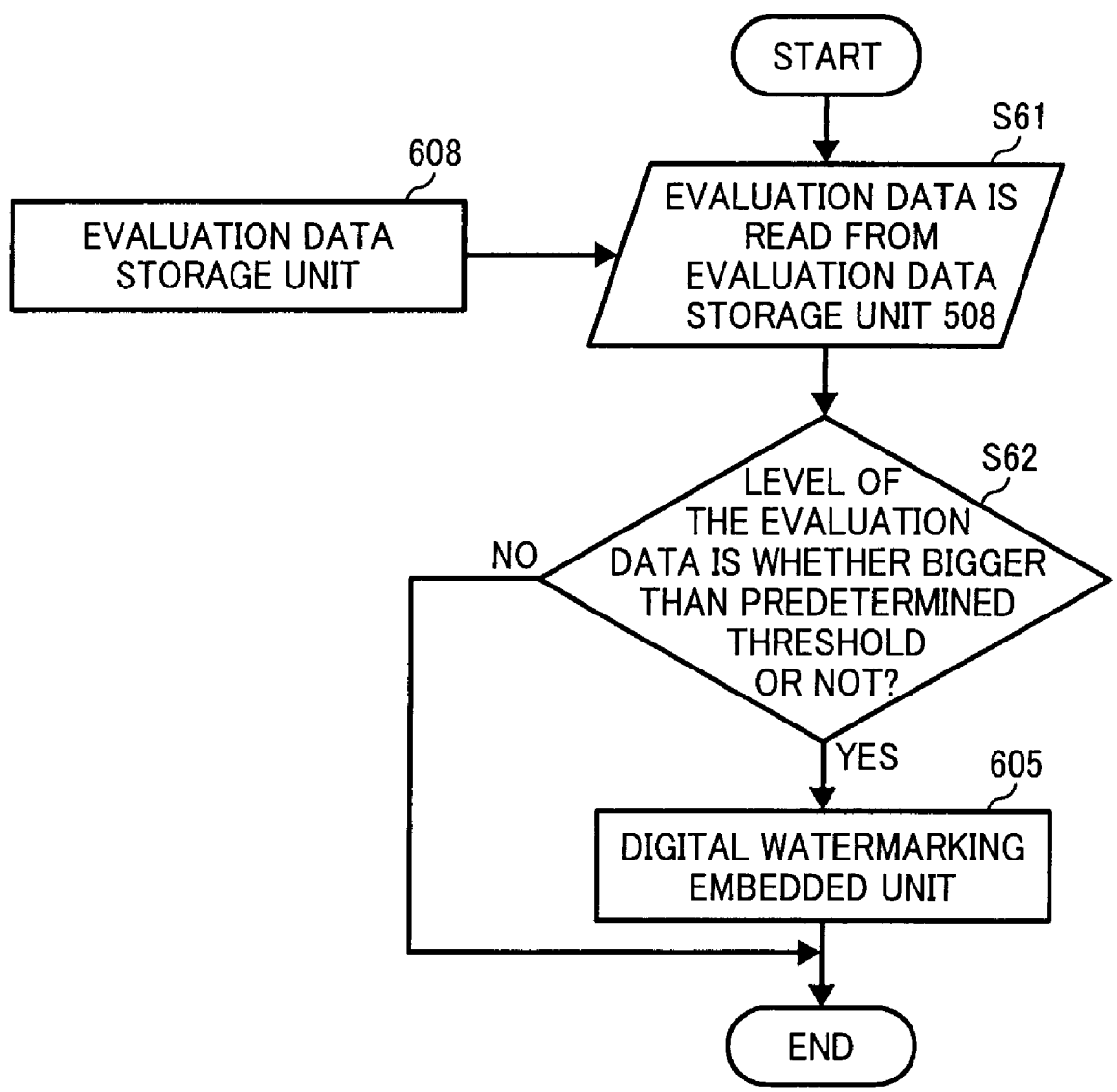
FIG. 11 is a block diagram showing an example of the system configuration for determination unit in the fifth embodiment.

The above-embodiment is explained assuming that the evaluation data is "1", however, it is also possible to set a threshold for the evaluation data as is done in the fifth embodiment. In this case, if the evaluation data is smaller than the predetermined threshold, the digital watermark information is extracted from all of the pertinent pages of the document as is shown in FIG. 11.

The sixth embodiment is shown using a block diagram of the determination unit 604. In this embodiment it is determined if the output form of the document image data is double-side printing. If so, it is then determined if the evaluation data is bigger than the predetermined threshold. Further, each evaluation data is then compared and the watermark information extracted from the page of the document which is determined to be the easiest to extract data from.

Figure 12:
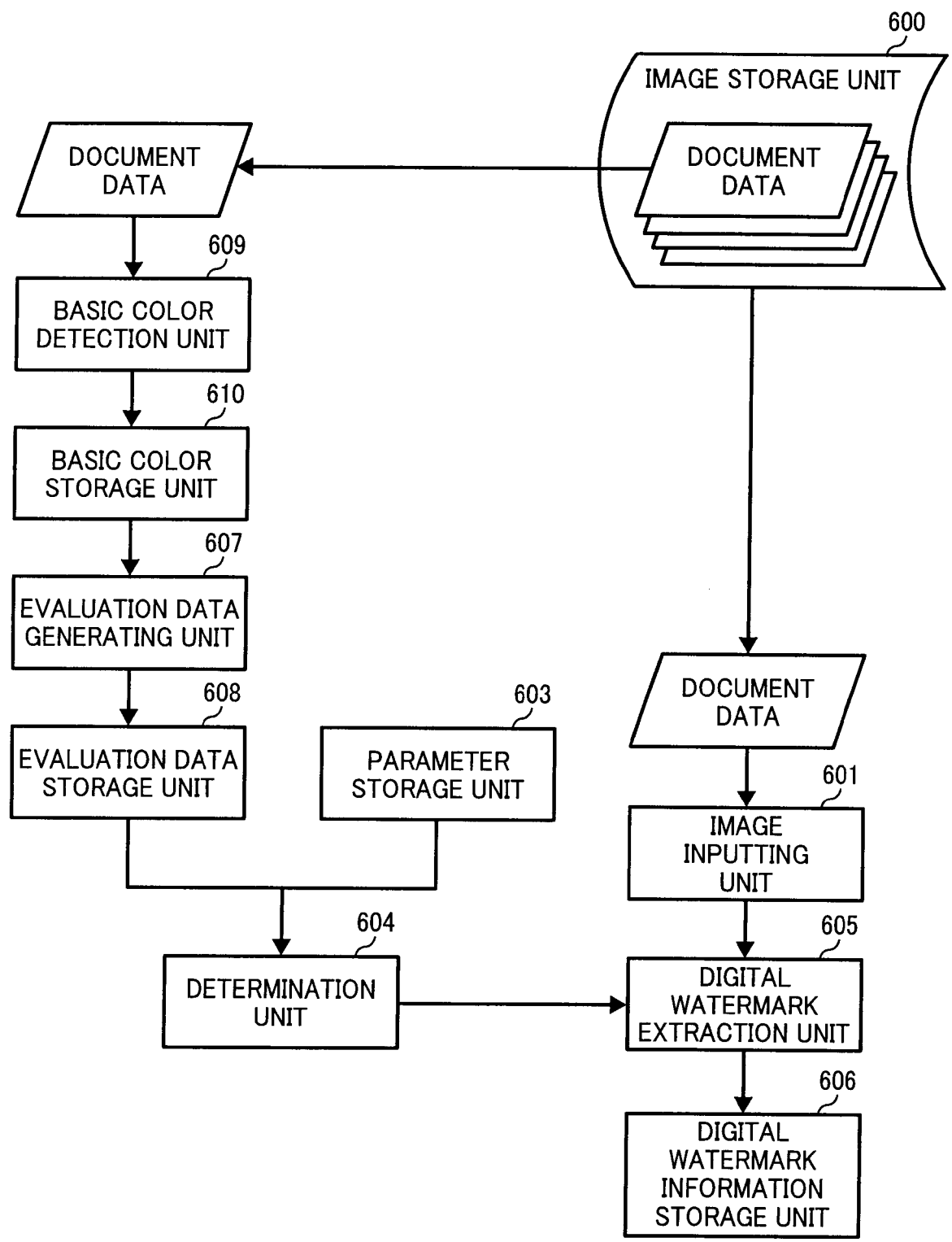
FIG. 12 is a block diagram showing an example of the system configuration for the digital watermark extraction system in the seventh embodiment.

FIG. 12 is a block diagram showing another example of a system configuration for a digital watermark extraction system. The digital watermark extraction system in FIG. 12 has a basic color detection unit 609 and a basic color storage unit 610 in addition to the composition described in the above embodiments.

The basic color detection unit 609 detects the brightness component of the document data by a pre-scan. A part that is brighter than a predetermined level is detected with the basic color part of the document image. For example, the method of the basic color detection may be a histogram analysis of the document data. The level of the basic color of the document data which is detected by the basic color detection unit 609 is stored in the basic color storage unit 610. Further, the level of the basic color of the document stored in the basic color storage unit 610 is then output to the evaluation data generating unit 607.

These features are useful due to the fact that the extraction accuracy of the digital watermark decreases when recycled paper is used. Thus, if recycled paper is used together with a document composed of two or more pages, the executed extraction processing tends to have lower extraction accuracy. As a result, the extraction processing of the digital watermark in this case may not be efficient. Furthermore, there is a possibility of damaging the digital watermark. However, this above noted embodiment solves this problem and it is possible to extract the digital watermark information with high accuracy and efficiency even when recycled paper is used.

What is claimed is:

1. An image forming apparatus for embedding digital watermark information into an image data of a document and outputting the image data, comprising:
   a first determination unit configured to determine a selected page of the document to embed the digital watermark information by comparing characteristics of each page with a predetermined threshold when the document is composed of two or more pages, the characteristics including a number of characters on the respective page;
   a digital watermark embedding unit configured to embed the digital watermark information into the selected page of the document determined by the first determination unit,
   an image outputting unit configured to output the image data which includes therein the digital watermark information embedded by the digital watermark embedding unit.

2. The image forming apparatus as claimed in claim 1, further comprising:
   an evaluation data generating unit configured to generate embedded evaluation data which corresponds to a numerical value corresponding to the level of difficulty of embedding the digital watermark information, wherein the level of difficulty of embedding corresponds to the amount of processing required to embed the digital watermark information,
   wherein the predetermined threshold corresponds to the embedded evaluation data generated by the evaluation data generating unit.

3. The image forming apparatus as claimed in claim 1, further comprising:
   a second determination unit configured to determine whether the image data of the document is on a top surface or a back surface of the document,
   wherein the evaluation data generating unit generates the evaluation data for each side of the document, and
   wherein the first determination unit determines the page of the document to embed the digital watermark information based on the embedded evaluation data generated by the evaluation data generating unit.

4. An image forming apparatus for extracting digital watermark information from an image data of a document, comprising:
   an input unit configured to input a document as the image data;
   a storage unit configured to store the image data of each page;
   a determination unit configured to determine a selected page of the image data from which the digital watermark information is to be extracted by comparing characteristics of each page with a designated threshold, the characteristics including a number of characters on the respective page;
   an extraction unit configured to extract the digital watermark information from the selected page of the image data that is determined by the determination unit as having the digital watermark information stored therein.

5. The image forming apparatus as claimed in claim 4, furthermore comprising,
   an evaluation data generating unit configured to generate an extraction evaluation data which is a numerical value that corresponds to a level of difficulty of extracting the digital watermark information for each page of the image data stored in the storage unit, wherein the level of difficulty of extracting corresponds to the amount of processing required to extract the digital watermark information,
   wherein the designated threshold corresponds to the extraction evaluation data generated by the evaluation data generating unit.

6. A method of image forming which embeds digital watermark information into an image data of a document and outputs the image data, comprising:
   determining a selected page of the document in which the digital watermark information is to be embedded by comparing characteristics of each page with a predetermined threshold when the document is composed of two or more pages, the characteristics including a number of characters on the respective page;
   embedding the digital watermark information into the selected page of the document determined by the determination step; and
   outputting the image data which is embedded in the digital watermark information by the embedding step.

7. The method of image forming as claimed in claim 6, further comprising:
   generating an embedded evaluation data which is a numerical value that corresponds to a level of difficulty of embedding the digital watermark information, wherein the level of difficulty of embedding corresponds to the amount of processing required to embed the digital watermark information,
   wherein the predetermined threshold corresponds to the embedded evaluation data generated by the generating step.

8. The method of image forming as claimed in claim 6, further comprising:
   determining whether the image data of the document is a surface or the back of the document,
   wherein the generating step generates the evaluation data for each page of the document, and
   wherein the page of the document into which the digital watermarking information is to be embedded is determined based on the embedded evaluation data.

9. A method of image forming which extracts digital watermark information from an image data of a document, comprising:
   inputting the document as the image data;
   storing the image data of each page;
   determining a selected page of the image data stored in the storage unit from which to extract the digital watermark information by comparing characteristics of each page with a designated threshold, the characteristics including a number of characters on the respective page;
   extracting the digital watermark information from the selected page of the image data determined by the determining step.

10. The method of image forming as claimed in claim 9, further comprising:

generating an extraction evaluation data which is a numerical value corresponding to a level of difficulty of extracting the digital watermark information for each page of the image data stored, wherein the level of difficulty of extracting corresponds to the amount of processing required to extract the digital watermark information, wherein the designated threshold corresponds to the extraction evaluation data.

\* \* \* \* \*